United States Patent [19]

Ercole et al.

[11] Patent Number: 4,848,005

[45] Date of Patent: Jul. 18, 1989

[54] REARRANGEABLE SUPPORTING AND POSITIONING FIXTURE, PARTICULARLY FOR PARTS MEASURABLE ON A GAUGING MACHINE

[75] Inventors: Maurizio Ercole; Renato De Alessi; Enrico Garau, all of Turin, Italy

[73] Assignee: D.E.A. Digital Electronic Automation S.p.A., Moncalieri, Italy

[21] Appl. No.: 151,453

[22] Filed: Feb. 2, 1988

[30] Foreign Application Priority Data

Feb. 3, 1987 [IT] Italy ................................ 67068 A/87

[51] Int. Cl.[4] ............................................... G01B 5/20
[52] U.S. Cl. ........................................ 33/568; 33/573; 33/549; 33/1 M
[58] Field of Search ................. 33/573, 568, 503, 504, 33/505, 1 M, 549, 529

[56] References Cited

U.S. PATENT DOCUMENTS 4,122,608 10/1978 Hopf ..................................... 33/549
4,593,476 6/1986 Clark .................................... 33/568

*Primary Examiner*—Harry N. Haroian
*Attorney, Agent, or Firm*—Gifford, Groh, Sheridan, Sprinkle and Dolgorukov

[57] ABSTRACT

A fixture comprising a number of rearrangeable elements; a hand operated by a robot and designed to position the aforementioned rearrangeable elements on a reference table; and a number of part supporting and clamping means. The aforementioned rearrangeable elements comprise a tubular casing sliding on an air-cushioned pad; and a rod designed to slide axially inside the aforementioned tubular casing and on to the top portion of which are secured the aforementioned supporting and positioning means. (FIG. 1).

32 Claims, 12 Drawing Sheets

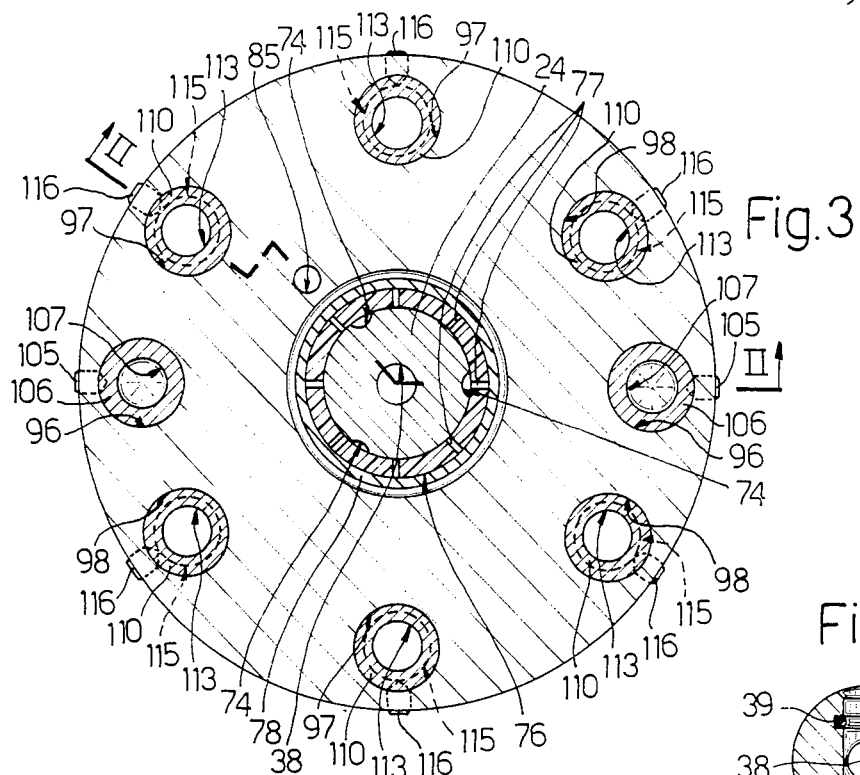
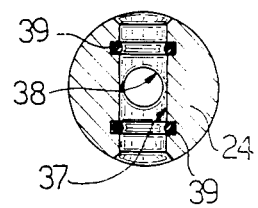
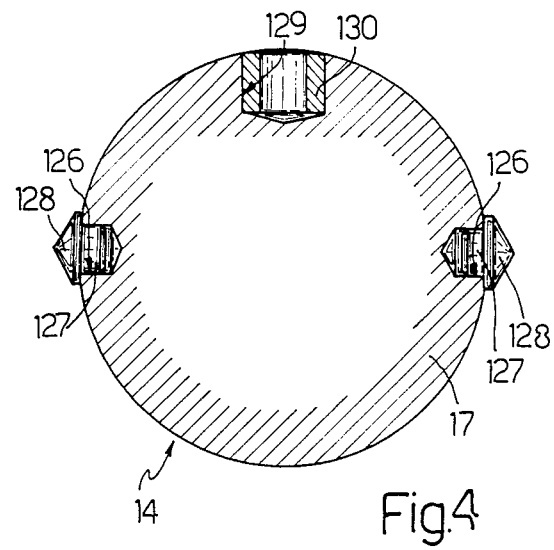
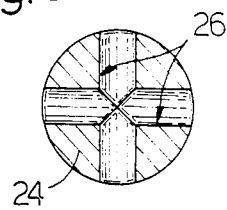
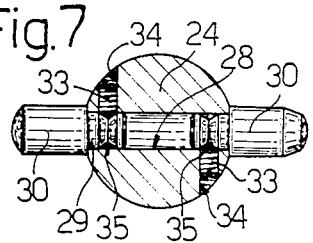

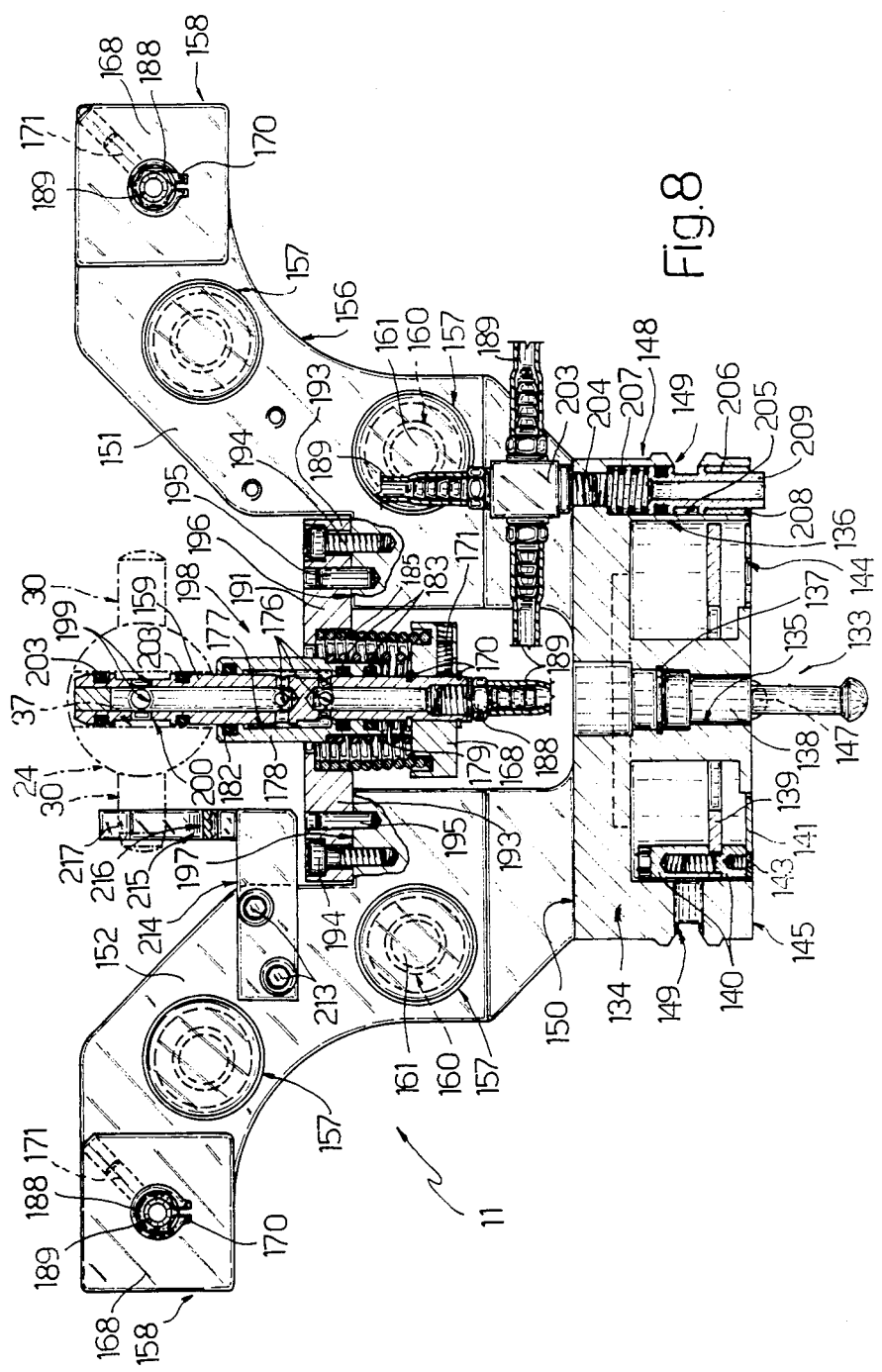

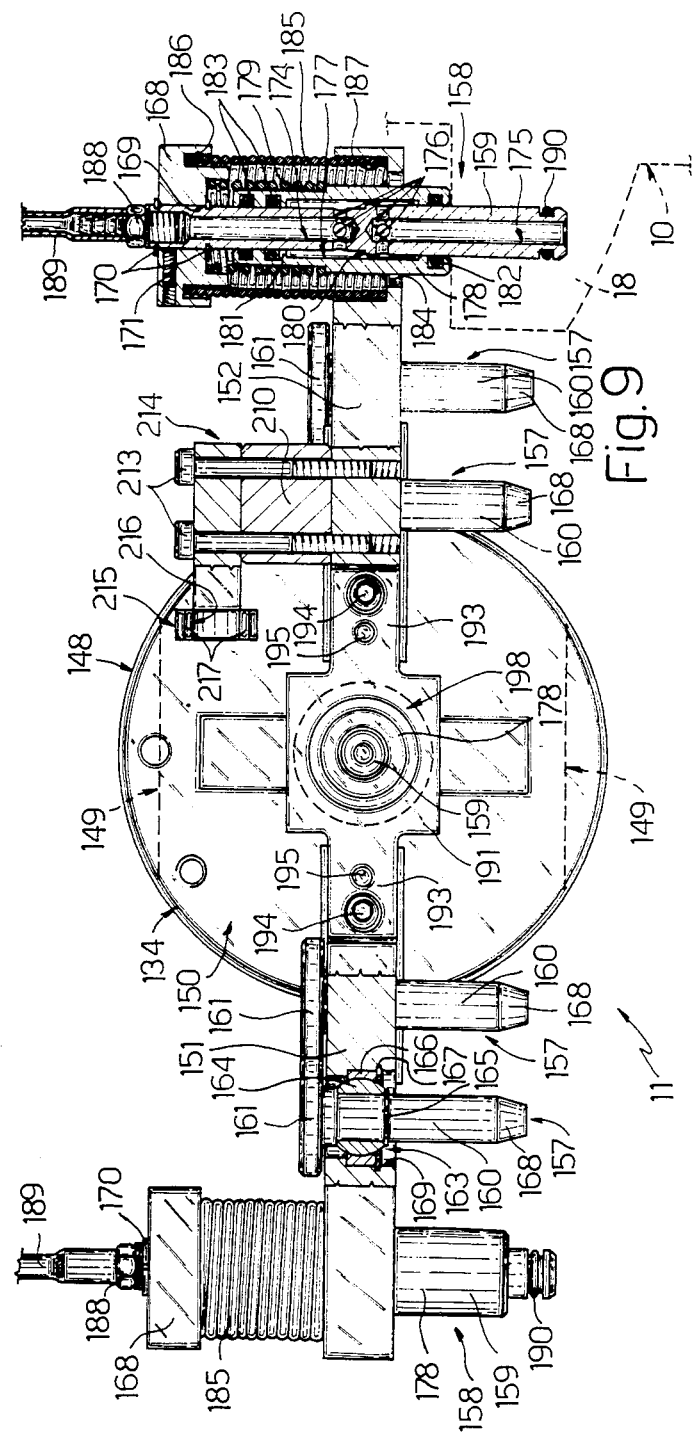

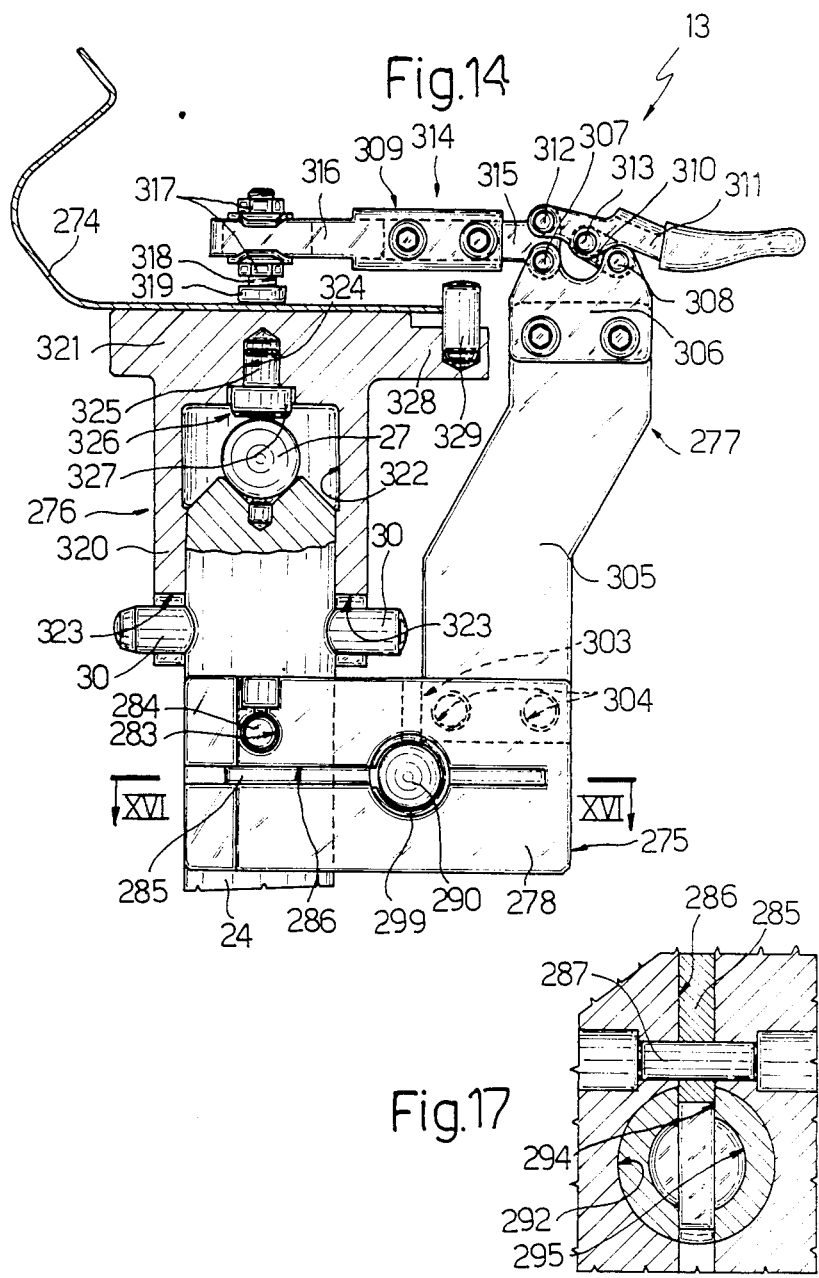

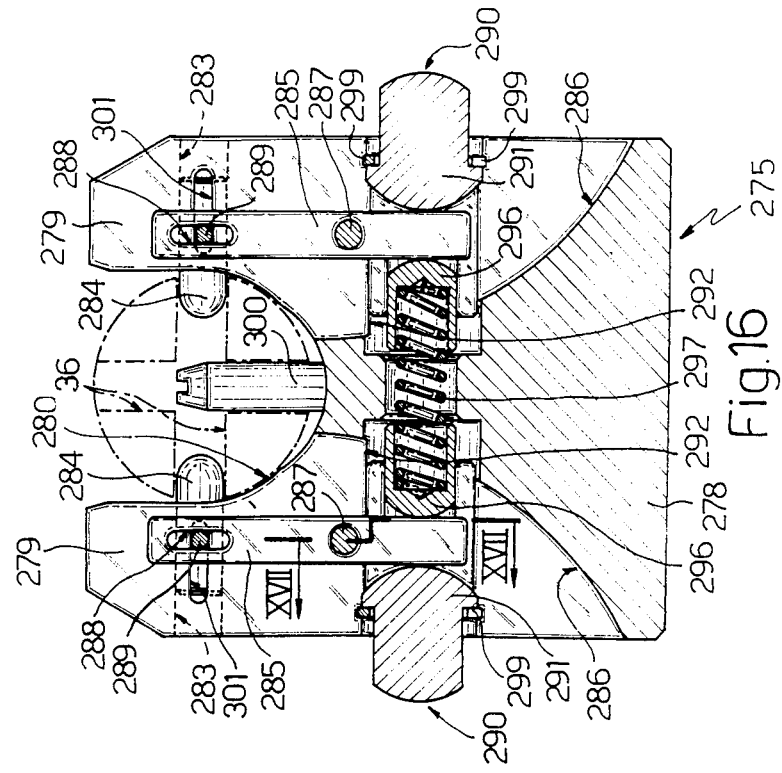
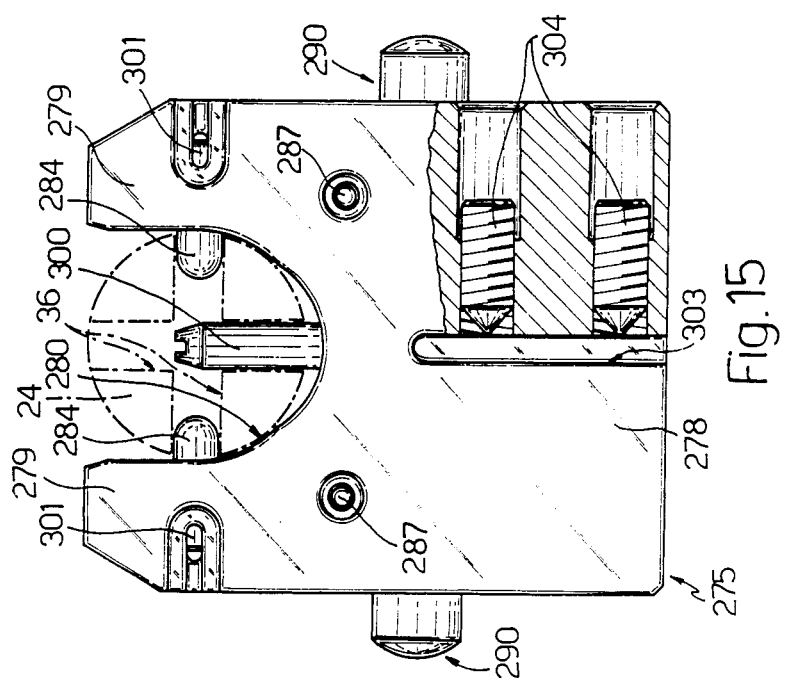

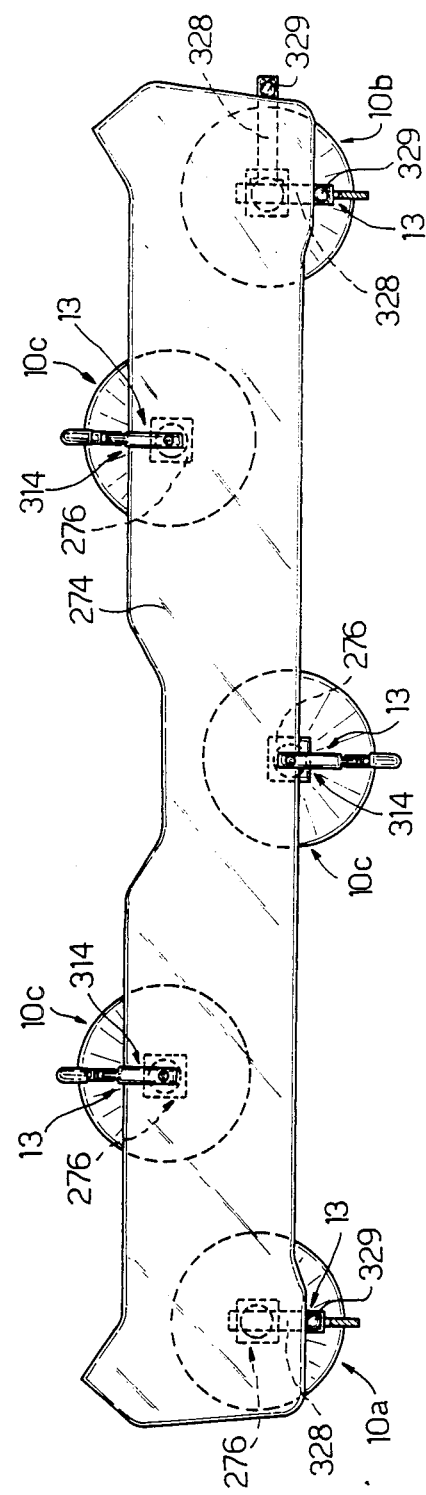

REARRANGEABLE SUPPORTING AND POSITIONING FIXTURE, PARTICULARLY FOR PARTS MEASURABLE ON A GAUGING MACHINE

BACKGROUND OF THE INVENTION

The present invention relates to a supporting and positioning fixture, particularly for parts measurable on a gauging machine.

Generally speaking, gauging machines are known to comprise a reference table on to which the part being measured is positioned, and at least one mobile member having a measuring head to which is fitted a stylus designed to intercept outer surface portions of the part, for measuring given dimensions of the same.

The part is usually positioned on the reference table by means of supporting and clamping fixtures. In particular, when dealing with other than highly rigid parts, which tend to fall out of shape under their own weight, the said fixtures must comprise a number of supporting portions formed to a high degree of dimensional accuracy and designed to cooperate with respective portions on the part being measured, so, as to substantially prevent any distortion of the same.

As a result, known fixtures, particularly those employed for measuring non-rigid parts, are designed solely for parts having specific geometrical characteristics. In view of the high degree of dimensional accuracy involved, such fixtures are extremely expensive, which expense is incurred whenever the type of part being measured is changed.

SUMMARY OF THE INVENTION

The aim of the present invention is to provide a supporting and positioning fixture, particularly for parts measurable on a gauging machine, designed to overcome the aforementioned drawback associated with the aforementioned known types of fixtures.

With this aim in view, according to the present invention, there is provided a supporting and positioning fixture, particularly for parts measurable on a gauging machine, characterised by the fact that it comprises: a number of rearrangeable elements comprising at least a first portion positionable on a reference table; first means for arresting the said first portion in a given position in relation to the said table; at least a second portion moving perpendicularly to the said table in relation to the said first portion; and second means for arresting the said second portion in relation to the said first portion;

means for supporting and clamping the said part and securable to the said second mobile portion of the said rearrangeable elements; and means for moving the said rearrangeable elements in relation to the said table, and the said second portion in relation to the said first portion of said rearrangeable elements.

BRIEF DESCRIPTION OF THE DRAWINGS

A preferred non-limiting embodiment of the present invention will be described by way of example with reference to the accompanying drawings, in which:

FIGS. 3, 4, 5, 6 and 7 show larger-scale sections along respective lines III—III, IV—IV, V—V, VI—VI, VII—VII in FIG. 2;

FIGS. 8 and 9 show partially-sectioned plan and front views respectively of a second component on the FIG. 1 fixture;

FIG. 14 shows a partially-sectioned view of a further component on the fixture according to the present invention;

FIG. 15 shows a larger-scale plan view of a detail on the FIG. 14 component;

FIG. 16 shows a section along line XVI—XVI in FIG. 14;

FIG. 17 shows a partial section along line XVII—XVII in FIG. 16;

FIG. 18 shows a schematic example of the fixture according to the present invention in actual use.

DETAILED DESCRIPTION OF THE INVENTION

Figure 1:
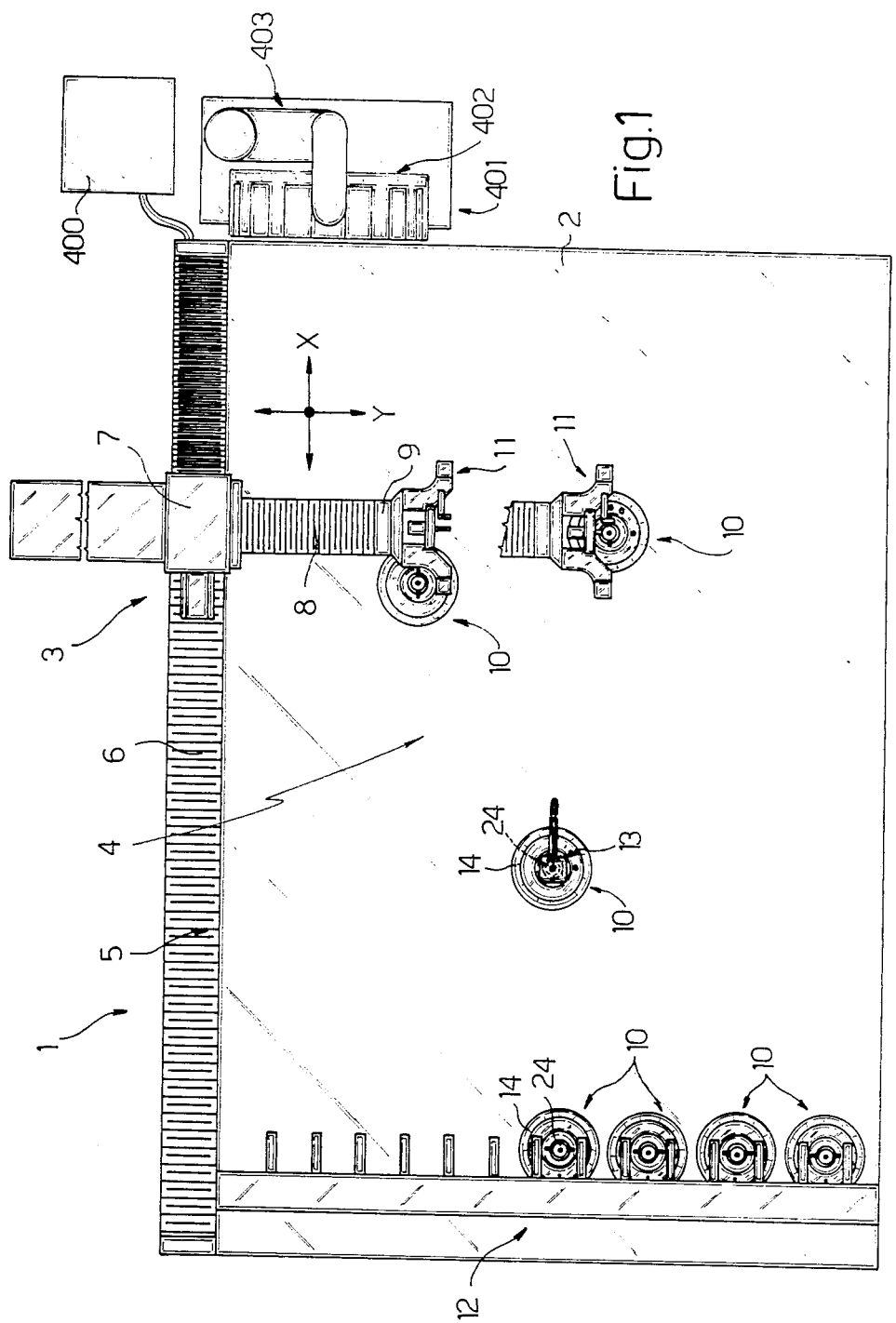
FIG. 1 shows a schematic plan view of a rearrangeable supporting and positioning fixture employed on a gauging machine.

Number 1 in FIG. 1 indicates a gauging machine comprising a reference table 2, a measuring robot 3, and a fixture 4 for positioning and supporting a part (not shown) for measurement. The said robot 3, which travels along a rail 5 suitably protected by a bellows 6 and parallel with the longitudinal X axis of table 2, presents a vertically-mobile head 7 fitted with an arm 8 designed to travel along the horizontal Y axis perpendicular to the said X axis. One end 9 of arm 8 presents gripping means (not shown), e.g. of the type described in Italian patent application No. 67545A/85 filed on 11-06-1985 by the present Applicant, designed to grip the shank of a measuring tool having a standard stylus (not shown) which, in actual use, is brought into contact with the surface of the part being measured.

According to the present invention, fixture 4 comprises a number of columns 10 (FIGS. 1 and 2) for supporting the said part as described later on; a hand 11 operated by arm 8 of robot 3 and cooperating with columns 10 so as to position the same on the said reference table 2; a rack 12 on one side of table 2, for storing columns 10 not employed on table 2; and a number of modular fixtures 13 (FIG. 14) for securing the said part to columns 10.

Figure 2:
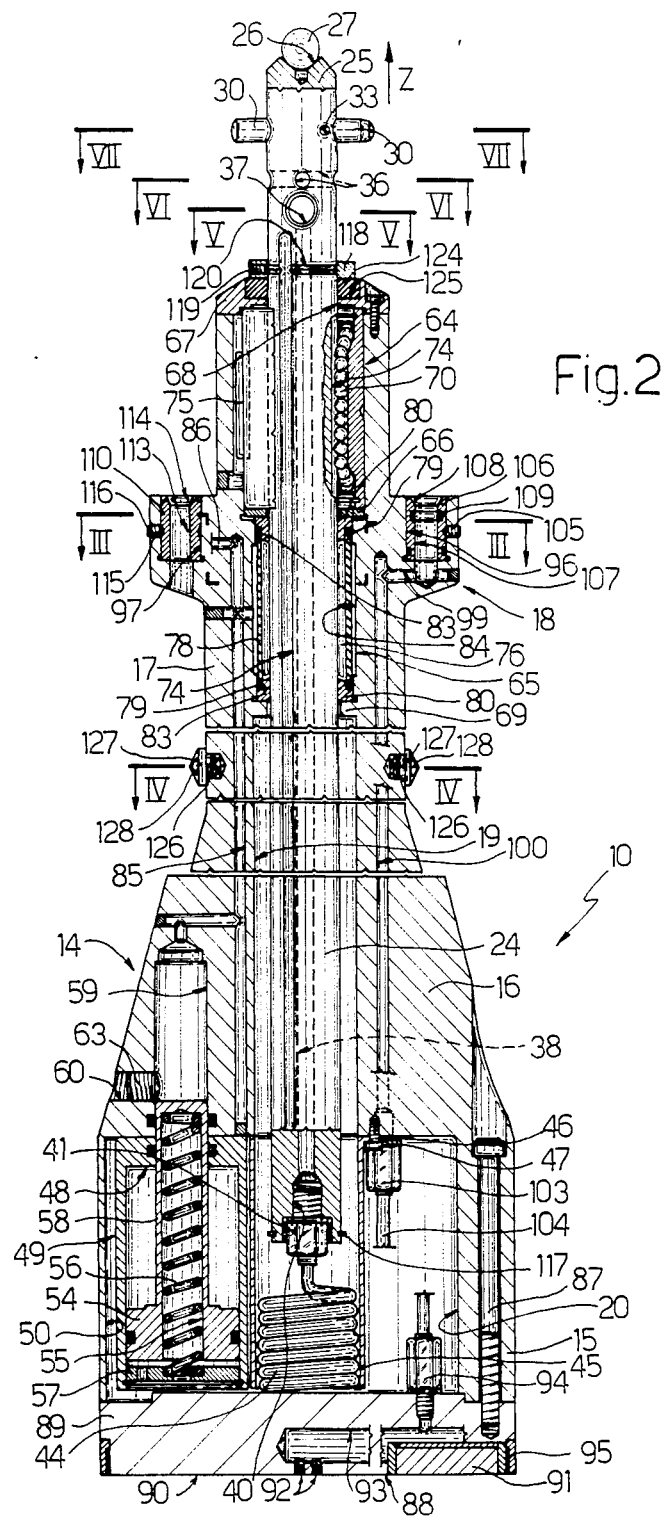
FIG. 2 shows a section of a first component on the FIG. 1 fixture, along line II—II in FIG. 3.

FIG. 2 shows a detail of one of columns 10, which comprises a tubular outer casing 14 having a substantially cylindrical bottom portion 15, a truncated-cone center portion 16 tapering upwards, and a substantially cylindrical top portion 17 forming an intermediate annular collar 18. The said center and top portions 16 and 17 present a cylindrical axial cavity 19 which comes out at the bottom inside a compartment 20 inside the said bottom portion 15. Inside the said cavity 19, there slides a cylindrical rod 24 which projects upwards from casing 14 and presents a truncated-cone top end 25 having a conical seat 26 inside which a ball 27 is secured, for example, by means of adhesive. Close to the said end 25, rod 24 presents a diametrical hole 28 (FIG. 7) inside which are inserted, on opposite sides, two shanks 29 of respective cylindrical pins 30 secured inside hole 28 by means of respective pins 33 screwed inside holes 34 perpendicular to hole 28 and gripped against respective annular grooves 35 on shanks 29.

Rod 24 also presents a pair of perpendicular, intersecting holes 36 (FIG. 6), and a further larger-diameter hole 37 having a horizontal axis perpendicular to the axis of hole 28. The said hole 37 (FIG. 5) communicates with a cylindrical cavity 38 inside rod 24, and presents a pair of sealing rings 39 arranged on opposite sides in relation to the inlet of cavity 38. The said cavity 38 comes out at the bottom inside a threaded seat 40 in which is mounted a fitting 41 for a hose 44 coiled inside a cylindrical guide casing 45 housed in the center of compartment 20. The said casing 45 presents substantially the same inside section as cavity 19, and has a top flange 46 for assembly via screws 47.

The other end of hose 44 is connected, in a manner not shown, to the upper chamber 48 of an air cylinder 49 housed in a recess 50 of compartment 20. The said cylinder 49 comprises a piston 54 having an inner cavity 55 housing a helical spring 56; which spring 56 is compressed against bottom wall 57 of cylinder 49 and pushes piston 54 upwards so as to force rod 58 of the said piston into an oil-filled cylindrical chamber 59 located facing rod 58 and formed in the intermediate portion 16 of casing 14. For draining off the oil, chamber 65 may communicate externally via a bottom hole 66 usually plugged by a threaded pin 63.

Rod 24 is supported radially and axially by a recirculating ball bush 64 and a flexible bush 65 respectively; both of which bushes are housed inside top portion 17 of casing 14, via the interposition of a spacer ring 66, and are locked axially against an inner shoulder 69 of cavity 19 by a top cover 67 on casing 14, having a center hole 68 for the passage of rod 24.

Bush 64, which is of known type, presents three sets of balls 70 spaced 120° apart and rolling in respective longitudinal grooves 74 on rod 24 so as to ensure low-friction axial slide and angular locking of the same, and is, in turn, locked angularly on to outer casing 14 by means of key 75.

Flexible bush 68, which is of known type, comprises a metal, substantially tubular inner element 76 in which are formed a number of axial slots 77 (FIG. 3). The said element 76 is covered with an elastomeric membrane 78 secured by means of rings 79 to respective opposite edges 80 of element 76; which rings 79 cooperate in sealing manner with respective annular portions 83 inside cavity 19.

One portion of cavity 19, located between and slightly larger in diameter than the said annular portions 83, defines an annular chamber 84 surrounding the said membrane 78 and communicating with chamber 65 via duct 85, which comprises a top branch 86 communicating with an oil filler opening (not shown).

Casing 14 is secured at the bottom, by means of peripheral screws 87, to an air-cushioned pad 88, e.g. of the type described in Italian Utility Pat. No. 53736-B/86 filed on 06-08-86 by the present Applicant. The said pad 88 comprises a disc 89, the bottom face 90 of which presents a number of permanent magnets 91 arranged radially. A number of nozzles 92 are provided towards the center of the said face and connected, via radial hole 93, to a fast-connect fitting 94 facing inside compartment 20. An annular strip 95 secured to the edge of pad 88 prevents dust particles from entering underneath pad 88 and so clogging the said nozzles 92.

Collar 18 presents eight equally-spaced peripheral axial holes 96, 97, 98 (FIG. 3), two of which (96) are dead and the others through holes. The said holes 96 are diametrically opposed and communicate, via radial holes 99, with a respective axial duct 100 formed through casing 14 and coming out at the bottom inside compartment 20. To the outlet portion of the said duct 100 there is screwed a fast-connect fitting 103 connected to the said fitting 93 on pad 88 via a hole 104 (only part of which is shown). A bush 106 is secured axially and angularly inside holes 96 by means of a transverse pin 105, which bush 106 presents a center hole 107 having a flared mouth portion 108 in the proximity of which is housed a sealing ring 109. Holes 97 and 98, respectively located at 90° in relation to holes 96 and midway between each pair of adjacent holes 96, 97, also house respective bushes 110 having respective slightly eccentric axial holes 113 with flared mouth portions 114. Bushes 110 present an annular outer groove 115 engaged by a respective transverse pin 116. The center distances of holes 113 and hole 107 may thus be adjusted, within certain limits, by turning bushes 110 inside holes 96, 97 and then locking them by means of respective pins 116.

Upward axial travel of rod 24 is limited by a circlip 117 at the bottom end of rod 24 and cooperating with shoulder 69, whereas downward travel is limited by a ring 118 secured by pin 119 to a circumferential groove 120 on rod 24, formed towards the top end of longitudinal grooves 74. A ring 124, formed from elastomeric material, is housed in a top seat 125 on cover 67, for absorbing the impact of ring 118.

As shown clearly in FIG. 4, towards the bottom end of top portion 17, casing 14 presents a pair of diametrically opposed holes 126 housing respective cylindrical elements 127 having a conical head 128, and a third hole 129 located at 90° in relation to holes 126 and housing a cylindrical bush 130.

Figure 10:
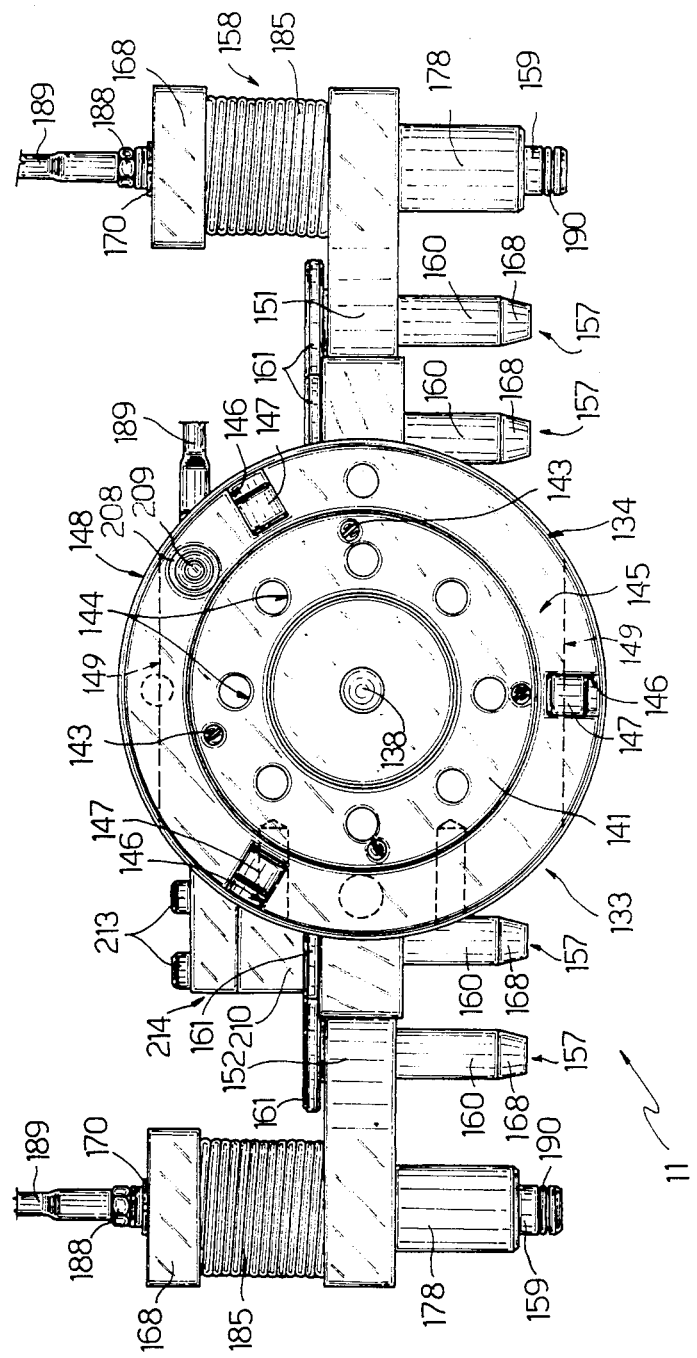
FIG. 10 shows a rear view of the FIGS. 8 and 9 component.

As shown in FIGS. 8, 9 and 10, hand 11 comprises a known type of connecting assembly 133, e.g. of the type described in Italian Patent Application No. 67545-A/85 filed on 11-06-1985 by the present Applicant, and conveniently the same as the measuring tool holders (not shown) employed on gauging machine 1. The said connecting assembly 133 comprises a disc 134 having a through center cavity 135 and an annular cavity 136. In the said center cavity 135, there is fitted, by means of a retainer ring 137, a shank 138 designed to cooperate with respective gripping members (not shown) on arm 8 of robot 3. The said cavity 136 houses a printed circuit board 139, which is supported in relation to disc 134 by a system of spacers 140 connected to disc 134 by means of threaded members (not shown), and is conveniently closed by a cover 141 secured by means of screws 143 to the said spacers 140 and having a number of openings 144 for enabling electrical connection of the said printed circuit 139 to the circuitry on robot 3. On a peripheral front portion 145 outside cavity 136, the said disc 134 also presents a set of three semicylindrical seats 146 arranged radially 120° apart, and housing respective cylindrical rollers 147 designed to cooperate in known manner with respective front surfaces on end 9 of arm 8. On the lateral surface 148 of disc 134, there are formed two diametrically opposed tangential grooves 149 engaged by respective gripping members on arm 8 or of tool store 401.

The said store 401 is conveniently located outside the measuring volume, and comprises a rotary head 402 designed to house the tools, and a mobile arm 403 designed to set the said head 402 in a position enabling access by arm 8 or robot 3.

From face 150 on disc 134, opposite the said shank 138, there extend two outwardly-curved arms 151 and 152. As the said arms 151 and 152 are symmetrical in relation to the median vertical plane of arm 11, only one of the said arms will be described herein, the other being symmetrically identical.

Arm 151 (152) presents a concave outer lateral profile 156 designed to cooperate with the outer surface of top portion 17 of casing 14 on column 10. The said arm 151 is fitted with two downturned drive pins 157, designed to engage respective holes 113 of two adjacent bushes 110, and a compressed air injection device 158, the outlet duct 159 of which is designed to engage hole 107 of bush 106 adjacent to the said bushes 110. The said pins 157 and the said injection device 158 obviously present the same angular spacing on arms 151 and 152 as respective bushes 110 and 106 on collar 18.

Pins 157 (FIG. 9) consist of a substantially cylindrical shank 160 and a circular head 161. The said shank 160 is housed in a hole 162 on arm 152 (151), to which it is secured by means of a spherical joint 163 for compensating for any misalignment between pin 157 and respective bush 110. In more detail, the said spherical joint 163 consists of a concave inner element 164 integral with shank 159, to which it is secured by means of a retaining ring 165, and a concave outer element 166 secured inside hole 160 by means of a second retaining ring 167. Joint 163 is assembled in such a manner that head 160 is left slightly clear of arm 151 (151), so as to enable pin 157 to oscillate in relation to arm 151 (151). Shank 159 presents a tapered-section end portion 168 for enabling it to be fitted easily inside bush 110.

Injection device 158 comprises a four-cornered plate 168 having a center through hole 169 inside which the said outlet duct 159 is fitted by means of a pair of retaining rings 170 and a transverse lock pin 171. Duct 159 consists of a tubular element having two opposed, non-communicating inner cavities 174, 175, each of which presents, towards the bottom, a number of radial holes 176 enabling communication with an inner chamber 177 of a bush 178 sliding in sealing manner along duct 159 against the action of a helical spring 179 wound about duct 159 and compressed between bush 178 and plate 168. Duct 159 presents a center outer shoulder 180 designed to cooperate with an upper inner projection 181 on bush 178 for arresting the same. The said sealing action is performed by a sealing ring 182 close to the bottom end of bush 178, and by a pair of sealing rings 183 housed apart inside the said upper projection 181.

The action exerted by spring 179 secures bush 178 in the position shown in FIG. 9 relative to injection device 158 on arm 152, in which position projection 181 cooperates with shoulder 180 and seals 183 are located up- and downstream respectively of holes 176 enabling communication between cavity 174 and chamber 177.

Injection device 158 is mounted loosely in a respective end hole 184 on arm 151 (152), and is connected to arm 151 (152) by means of a helical spring 185 packed in substantially undeformed manner with its opposite ends housed inside respective seats 186, 187 on plate 168 and hole 184. The function of the said spring 185 is to allow device 158 to adapt slightly (by traversing or rotating) in relation to bush 106.

The top of duct 159 is connected, via fitting 188, to a hose 189 for supplying air to injection device 158.

A sealing ring 190 is fitted to the outside of duct 159, towards the bottom end, and is designed to cooperate in sealing manner with the lateral surface of hole 107 on bush 106.

A four-cornered plate 191 presents a pair of lateral appendixes 193 connected, via respective screws 194 and reference pins 195, to respective supporting portions 196, 197 inside arms 151, 152. The said plate 191 is fitted with a further injection device 198 arranged horizontally and facing the opposite way to shank 138. The said device 198, which is designed to supply compressed air inside hole 37 of rod 24 on columns 10, is practically identical to device 158 already described, the parts common to both being indicated in FIG. 8 using the same numbering system. The only difference between devices 198 and 158 is that outlet duct 159 on device 198 is closed at one end and presents a number of radial holes 199 which come out inside a smaller-diameter outer portion 200. A pair of sealing rings 203, located on opposite sides in relation to the said portion 200, provide for sealing, in use, against the inner wall of hole 37.

Supply hoses 189 of devices 158 and 198 are connected to a cross fitting 203 screwed to a threaded portion 204 of a through hole 205 on disc 134. The said hole is fitted, in sliding and sealing manner, with a tube 206 pushed by a spring 207 against a stop bush 208, so that an end portion 209 projects outwards of disc 134 on the shank 138 side, for cooperating with known air supply means carried on arm 8 of robot 3.

Via the interposition of a spacer block 210 and by means of a pair of screws 213, arm 152 is fitted with a substantially L-shaped element 214 having a substantially fork-shaped end 215 parallel with the axis of device 198. The said end 215 comprises a longitudinal groove 216 having a mouth portion 217 increasing in width outwards.

Figure 11:
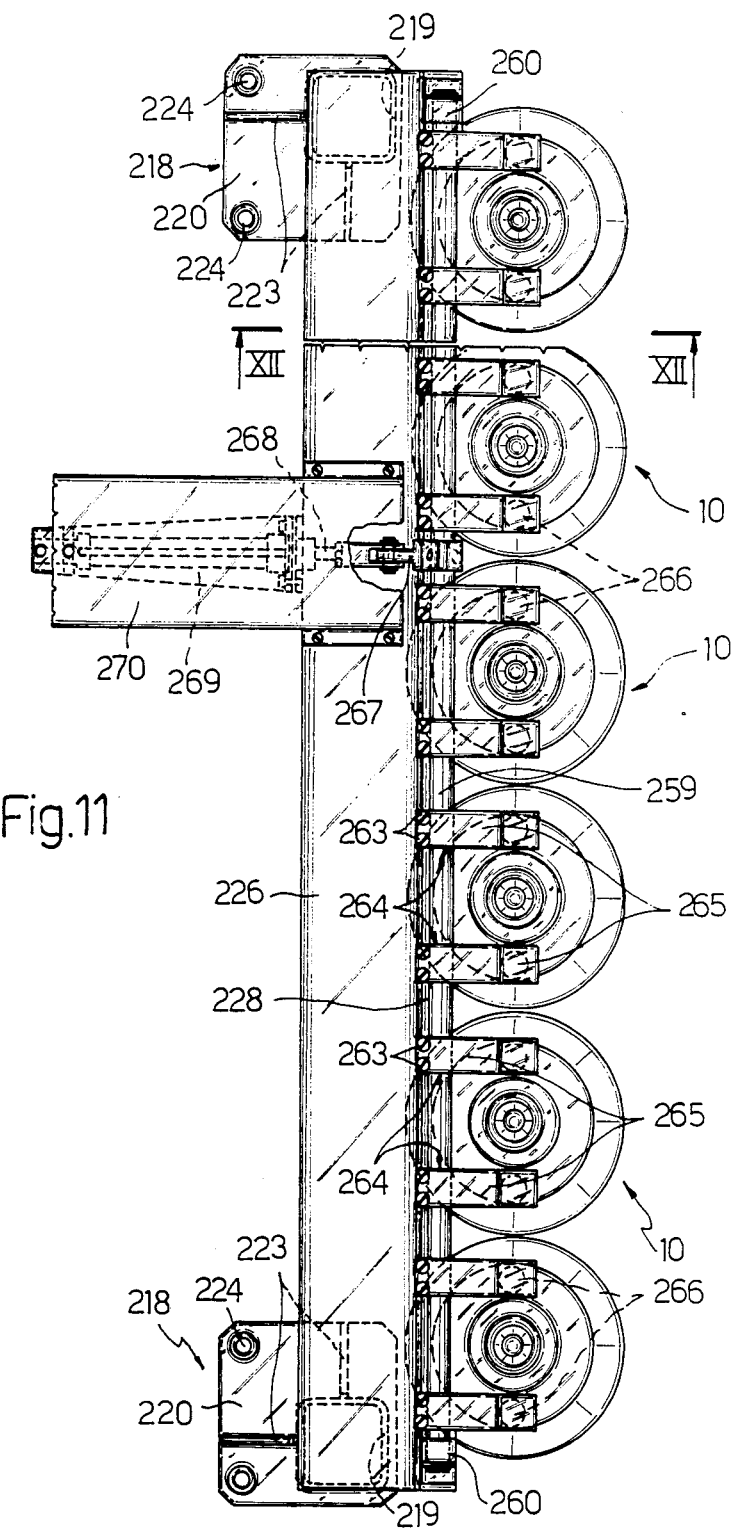
FIG. 11 shows a top plan view of a third component on the FIG. 1 fixture.
Figure 12:
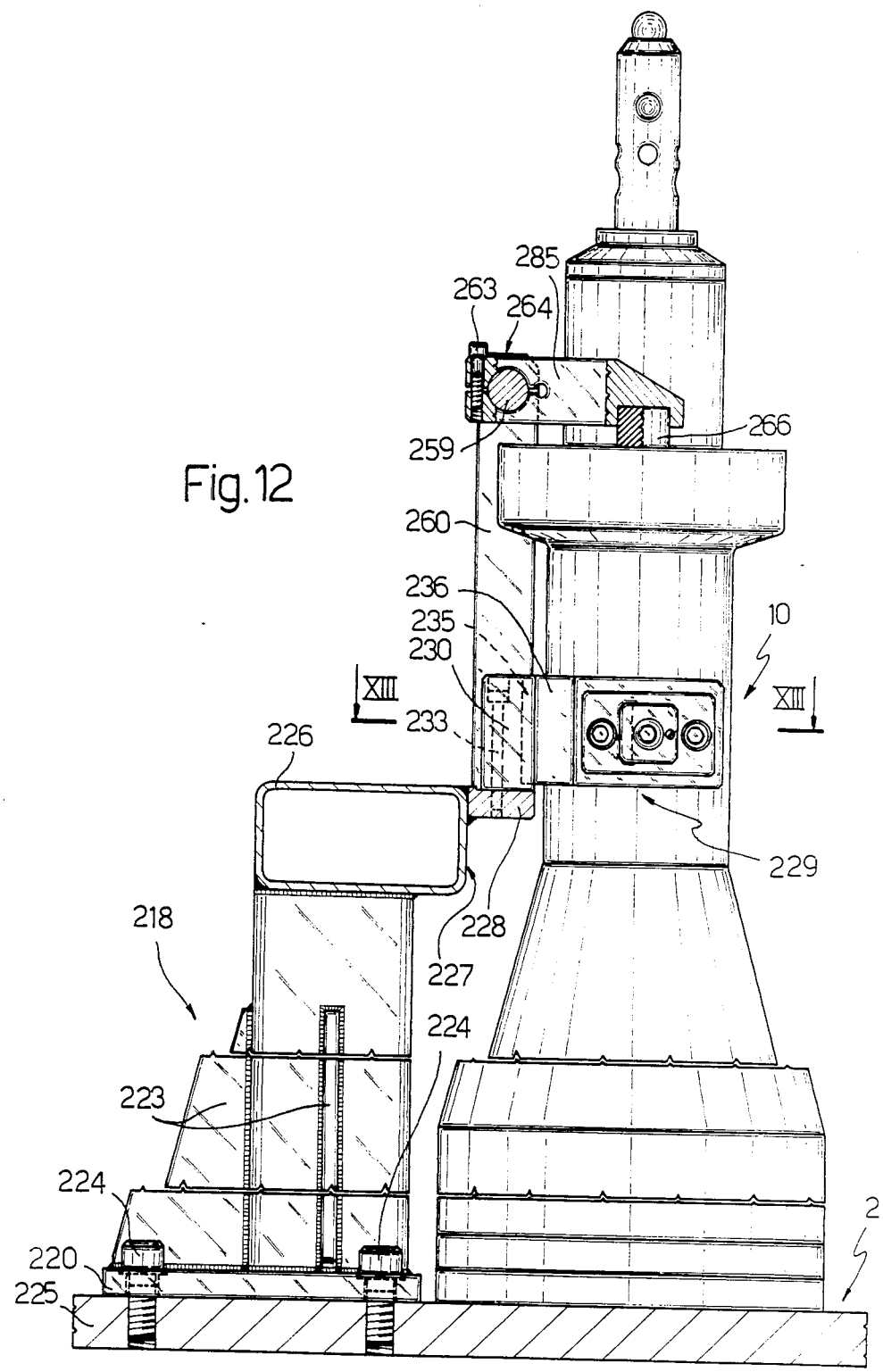
FIG. 12 shows a larger-scale section along line XII—XII in FIG. 11.
Figure 13:
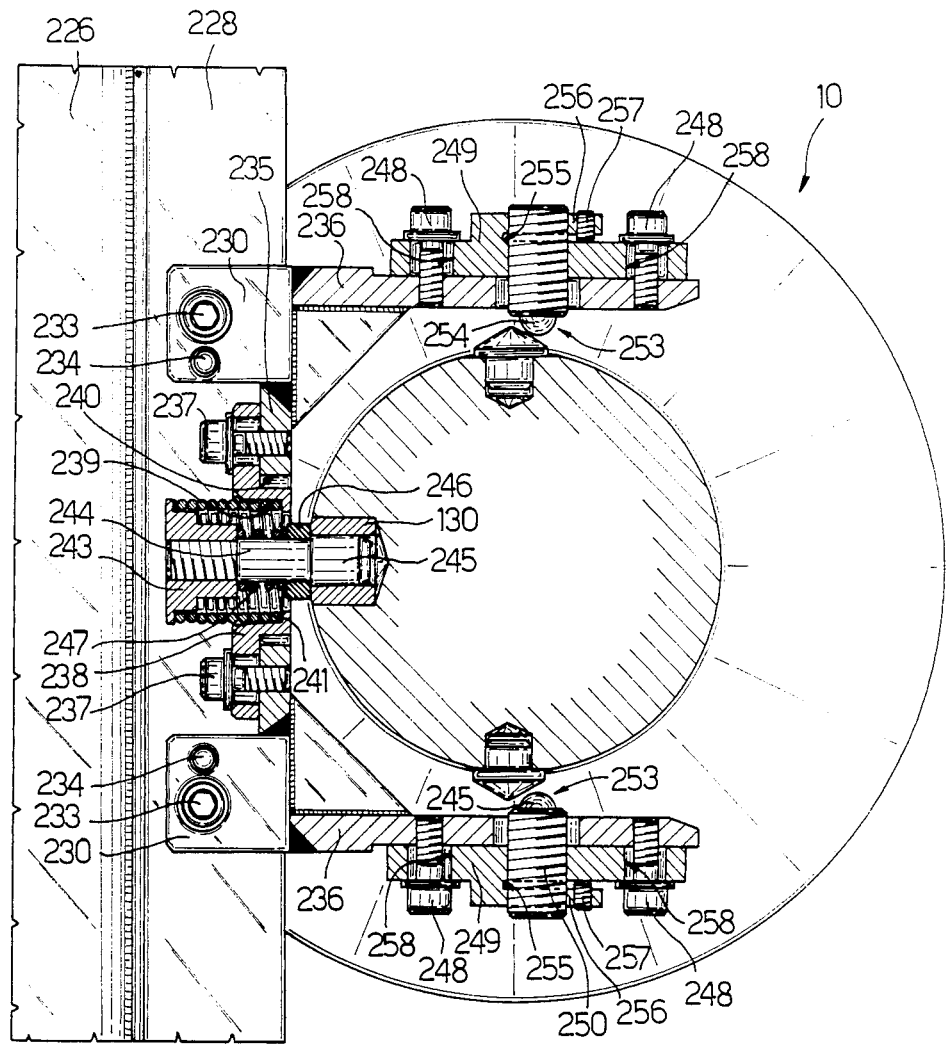
FIG. 13 shows a larger-scale, partially-sectioned plan view of a detail on the FIG. 11 component.

As shown in FIGS. 11, 12 and 13, rack 12 comprises a pair of end supports 218 consisting of a square-section upright 219 welded to a supporting base 220 and having strengthening ribs 223 welded to uprights 219 an respective bases 220.

Bases 220 are secured, by means of screws 224, to a peripheral portion 225 of reference table 2. To uprights 219 is welded a cross member 226 consisting of a rectangular section, the face 227 of which, facing reference table 2, is welded to a bar 228 for supporting a number of assemblies 229 for locking columns 10.

Each assembly 229 comprises a pair off substantially parallelepiped blocks 230 fitted to bar 228 by means of a screw 233 and reference pin 234. To the said blocks 230 are butt welded an intermediate plate 235, which connects the said blocks together, and two respective side plates 236 extending from the said blocks towards the measuring volume. Intermediate plate 235 is fitted, by means of a pair of screws 237, with a plate 238 defining a hollow cylindrical seat 239 housed loosely in center hole 240 of intermediate plate 235. Inside the said seat 235, there is fitted a highly rigid helical spring 241 packed in substantially undeformed manner, the opposite end of which spring 241 is fitted to a hollow threaded bush 243 to which is screwed a pin 244 projecting through cylindrical seat 238 in the direction of the measuring volume. The said pin 244 presents a chamfered enlarged end portion 245 designed to engage the bush 130 of a respective column 10. The said enlargement 245 also acts as an axial stop for a ring 246 mounted in sliding manner on pin 244 and loaded by a spring 247.

Each of side plates 236 is fitted, by means of a pair of screws 248, with a respective plate 249 to which is screwed centrally the body 250 of a flexible retainer 253 having a ball 254 facing inwards of assembly 229, loaded by a spring (not shown), and designed to cooperate with the conical head 128 of a respective pin 127 on column 10. The center portion of plate 249 to which body 250 is screwed presents a slot 255 formed crosswise in relation to the said body and defining a flexible blade 256 integral with plate 249. The said blade 256 is flexed by a pin 257 screwed inside blade 256 itself and designed to press against plate 249 for preventing accidental unscrewing of body 250.

It will be noted that both screws 237 of plate 238 and screws 248 of plates 249 are fitted inside respective slots 258 on the respective plates, for enabling a certain amount of adjustment to the position of the said plates. As shown clearly in FIGS. 11 and 12, rack 12 also comprises a rotary shaft 259 supported at both ends by two uprights 260 extending upwards from bar 228.

The said shaft 259 is fitted, by means of screws 263, with the jaw-shaped ends 264 of a number of arms 265 arranged in pairs substantially on the vertical of each assembly 229 and having, on the underside of their opposite ends, respective pads 226 of any type of soft material, e.g. rubber, designed to cover holes 107 supplying air to columns 10, for the purpose of preventing entry by solid particles.

Shaft 259 is connected integral with one end of a connecting rod 267, the opposite end of which is hinged to the rod 268 of an air cylinder 269 secured to cross member 226 by means of a conventional supporting structure 270 partially illustrated in FIG. 11.

Number 13 in FIG. 14 indicates a fixture for securing a part 274 to one of columns 10. Fixture 13 comprises a base 275 for connecting fixture 13 itself to rod 24 of column 10; a supporting element 276 designed to fit on to the top end of rod 24 and so support the said part 274; and a clamping element 277 secured to base 275 and designed to clamp part 274 on to supporting element 276.

As shown clearly in FIGS. 15 and 16, base 275 comprises a body 278 having a pair of arms 279 defining a cavity 280 for receiving rod 24. The said arms 279 present respective transverse holes 283 inside which slide two spherical-ended pins 284 designed to engage, on opposite sides, hole 36 on rod 24. Sliding of pins 284 is controlled by a pair of levers 285 housed inside respective longitudinal slots 286 on arms 279 and pivoting centrally on the said arms by means of respective cylindrical pins 287. Each lever 285 presents, at one end, a slot 288 engaged in sliding manner by a pin 289 integral with and arranged crosswise in relation to pin 284. Pins 289 are mounted so as to slide along respective slots 301 on arms 279, parallel with the axes of pins 284. Levers 285 may be operated manually by means of respective substantially cylindrical push bottons 290 comprising a larger-diameter portion 291 sliding inside a respective hole 292 on body 278, and a smaller-diameter portion 293 projecting from hole 292 outwards of body 278. The said portion 291 (FIG. 17) presents a diametrical slot 294 housing the end of lever 285 opposite slot 288; and a cylindrical axial cavity 295 housing a respective push rod 296. A pressure spring 297 is provided between the said push rods 296 for ensuring the latter maintain contact between levers 285 and respective push buttons 290. For this purpose, both push rods 296 and end walls 298 of slots 294, with which levers 285 cooperate, are suitably rounded for enabling uniform contact of levers 285 in any position. A retaining ring 299 is provided for preventing withdrawal of push buttons 290 from holes 292.

To body 278 is fitted in any appropriate manner, e.g. screwed, a further pin 300 projecting inside cavity 280 and perpendicular to and in the same plane as pins 284. Finally, body 278 presents an upper longitudinal groove 303 inside which a vertical bracket 305 of clamping element 277 is secured by means of a pair of transverse pins 304. To the top of the said bracket is connected a known type of support 306 for two pins 307, 308 on which pivot a clamping arm 309 and a connecting rod 310 respectively. By means of a further pair of pins 312, 313, a manually-operated clamping lever 311 pivots respectively on arm 309 and the opposite end of connecting rod 310, so as to form a known type of articulated four-sided clamping device 314.

Arm 309 comprises a first portion 315 and a second portion 316 secured, e.g. bolted, to each other. On one end 318 of portion 316, there is fitted, by means of a pair of nuts 317 for regulating its axial position, a threaded rod 318 having, at the bottom, a head 319 conveniently covered with soft material and designed to cooperate with part 274.

Supporting element 276 comprises a substantially tubular bottom portion 320 having a four-cornered outer section, and a substantially flat top portion 321 constituting the actual support for the said part 274. Portion 320 defines a cylindrical inner cavity 322 engaged, in use, by rod 24 of a column 10, and presents, at the bottom, a pair of diametrically opposed slots 323 designed to receive pins 30 of rod 24 and having spring retainers (not shown) similar to retainers 253 already described and designed to retain the said pins 30.

Portion 321 presents a dead hole 324 facing cavity 322, in which hole 324 there is fitted the cylindrical shank 325 of a supporting element 326 having a head 327 cooperating, in use, with ball 27 on the end of column 10. Top portion 321 may be of any shape and size, depending on the shape and size of part 274. In the FIG. 14 case, in particular, a lateral appendix 328 may extend integrally and on to which appendix is fitted, e.g. driven, a vertical cylinder 329 designed to act as a lateral support for pre-positioning 274 as described in more detail later on.

Operation of fixture 1 will now be described commencing with all of columns 10 located in rack 12 to the side of the measuring volume. At this stage, rack 12 is assumed to be set for enabling withdrawal of columns 10, as described in detail later on. Each column 10 is locked on the XY table by virtue of the action exerted by magnets 91 on pad 88. Rod 24 is also locked axially by flexible bush 65, which provides for radial locking by virtue of the oil inside annular chamber 84 and duct 85, which oil is maintained under pressure by rod 58 of piston 54 by virtue of the action of spring 56.

Robot 3, of known type, withdraws hand 11 from tool store 401. Connection of hand 11 on to arm 8, which is performed as described in the said patent application No. 67543-A/85, brings end portion 209 of tube 206 into contact with the said air supply means the said arm 8 is provided with. Such contact is made by virtue of the thrust exerted by spring 207 which also provides for sealing. Though injection devices 158 and 198 are thus supplied, no compressed air is emitted due to springs 179 maintaining bushes 178 in the FIG. 10 position.

Arm 8 then moves over to rack 12, so as to position injection device 158 of arm 151 on hand 11 on the vertical of one of holes 96 on collar 18 of a column 10, and consequently position pins 157 on the vertical of respective holes 97, 98.

Operation of robot 3 is fully controlled by a processing and control unit 400 shown schematically in FIG. 1. Hand 11 is then lowered by arm 8 on to column 10, and duct 159 and pins 157 engage respective cavities 107 and 113 of bushes 106 and 110. In particular, engagement by duct 159 is assisted by the manner in which it is secured to hand 11. Spring 185, in fact, allows duct 159 a limited amount of adjustment by allowing it to traverse or rotate in any direction. For the same purpose, pins 157 are provided with lead-in portions 168, and are fitted with spherical joints 163 for compensating for any errors in parallelism between the axes of bushes 110.

Duct 159 engages cavity 107 of bush 106 in progressively sealing manner until bush 178 of device 158 cooperates frontally with bush 106, and backs up against the action of spring 179 into the position shown in FIG. 9. In this position, holes 176 of duct 159 are connected by chamber 177 of bush 178, and compressed air flows through hole 99, duct 100, hose 104, and duct 93 to nozzles 92 on pad 88, so as to create, firstly, a sufficiently strong air cushion to detach column 10 from table 2 against the action of magnets 91, and, secondly, a load-bearing passage enabling low-friction displacement of column 10 over table 2.

Such displacement is performed by robot 3, which moves column 10 by means of pins 157 on hand 11, and positions it so that its axis is located at a point on table 2 having given X, Y coordinates.

Subsequent to positioning of column 10, an electrovalve (not shown) activated by the control logic on robot 3 cuts off air supply to column 10, which is again locked in position by magnets 91.

Hand 11 is then raised so as to release pins 157 and duct 159 of injection device 158, and is moved frontally (FIGS. 1 and 8) over to the top portion of rod 24, so that duct 159 of injection device 198 engages hole 37 on rod 24, and the forked end 215 of element 214 surrounds one of pins 30 on rod 24. Air supply to device 198 is activated in exactly the same way as for device 158. In particular, bush 178 cooperates frontally with rod 24, and backs up against the action of spring 179, thus causing chamber 177 inside bush 178 to connect holes 176 on duct 159, and compressed air to flow along duct 159 and, through holes 199, to the compartment defined by smaller-diameter portion 200 of duct 159 and by the wall of hole 37. External sealing is provided for by seals 203, which are located up- and downstream from the inlet of center duct 38 of rod 24, through which air is supplied to hose 44 and air cylinder 49. Piston 54 of cylinder 49 moves down to depressurize the oil locking flexible bush 65. Rod 24 is therefore free to slide axially, and is moved into a given position (Z) by hand 11 via element 214 cooperating with pin 30. The said electrovalve again cuts off the air supply, causing piston 54, by virtue of spring 56, to compress the oil and again lock flexible bush 65 which, in turn, locks rod 24.

In exactly the same way, all the columns 10 required for supporting and positioning part 274 are set up on table 2 and adjusted in height, after which, part clamping fixtures 13 are assembled on to columns 10.

In particular, supporting element 276 of each fixture 13 is fitted downwards on to respective rod 24 so that pins 30 fit inside slots 323 and are held in place, as already described, by the said spring retainers. Base 275 of fixture 13, on to which respective clamping element 277 has already been mounted, is then moved over to respective rod 24 by holding down push buttons 290. Pins 284 are withdrawn, thus enabling rod 24 to engage cavity 280, and pin 300 to engage one of holes 36 on rod 24. Push buttons 290 are then released, and spring 297 sets control levers 285 back to the FIG. 16 position, thus causing pins 284 to engage the other hole 36 on rod 24.

Part 274 is positioned on supporting elements 276 and clamped by manually operating lever 311.

As shown clearly in FIG. 18, for supporting and positioning prevalently two-dimensional parts 274 highly susceptible to bending under their own weight (e.g. sheet metal or molded plastic parts), a number of columns 10a, 10b, 10c are conveniently employed. Of these, two (10a, 10b) also provide for pre-positioning the part, for which purpose, respective supporting elements 276 present an appendix 328 and two perpendicular appendixes 328 respectively, the cylinders 329 of which form three unaligned points for laterally supporting and accurately positioning part 274. The remaining columns (10c) provide solely for supporting and clamping part 274, and have no lateral positioning elements. The X, Y and Z positioning coordinates of each column 10 are them memorised on control unit 400, which thus defines and preserves each new configuration of fixture 4.

Upon completion of the measuring cycle, during which robot 3 conveniently replaces hand 11 with a measuring tool from tool store 401, the configuration of fixture 4 may be rearranged by repeating the above process in reverse.

Once fixtures 13 have been taken off respective columns 10, each of the latter is replaced in a respective assembly 229 on rack 12, as shown in FIG. 13.

To do this, the control unit activates air cylinder 269 via appropriate electrovalves (not shown), so as to turn shaft 259 and raise arms 285. Column 10 is then inserted inside assembly 229 so that enlargement 245 on pin 244 engages bush 130 in hole 29 on column 10 itself. As column 10 approaches centering pin 244, balls 254 of spring retainers 253 cooperate with conical heads 128 on elements 127. Bush 130 is arrested against ring 246 so as to slightly compress spring 247, the load of which maintains column 10 in a position wherein the said conical heads 128 contact balls 254. Spring 241 allows a certain amount of adjustment to the position of pin 244, for compensating for any misalignment or parallelism errors between pin 244 and bush 130.

The control unit arrests the column in the said position by cutting off the air supply. Once all the columns 10 have been placed in rack 12, cylinder 269 is activated for lowering arms 265 and respective pads 266 on to air supply holes 107.

The advantages of fixture 4 according to the present invention will be clear from the foregoing description. First and foremost, fixture 4 may be set up in an infinite number of configurations for supporting and positioning parts of different shapes, sizes and structures, by simply varying fixtures 13, which are modular in design, comprising a common base 275, on to which may be mounted different elements readily available on the market.

This provides for dispensing with specially designed fixtures, with the dual advantage of drastically reducing retooling and production cost, thanks to the scale economies derived from modular component design and standardization.

Fixture 4 may be used to particular advantage for supporting and positioning parts deformable under their own weight (e.g. certain car body or aircraft components), in which case, a sufficient number of columns 10 are employed for maintaining the part substantially undeformed. Fixture 4 may also be employed for supporting and positioning rigid parts, in which case, obviously, only a small number of columns 10 need by employed.

To those skilled in the art it will be clear that changes may be made to fixture 4 as described and illustrated herein without, however, departing from the scope of the present invention. In particular, columns 10 may be replaced by a number of elements of any type, providing they are repositionable within the measuring volume.

Fixtures 13 may be secured to columns 10 or the said elements in any convenient manner, and may comprise clamping elements of any type, e.g. magnets or suckers. Fixture 4 may be employed on any type of machine, in particular, conveniently presenting a pair of opposed robots traveling along opposite sides of reference table 2.

We claim:

1. A supporting and positioning fixture, particularly for parts measurable on a gauging machine, characterised by the fact that it comprises:
   a number of rearrangeable elements (10) comprising at least a first portion (14) positionable on a reference table (2); first means (91) for arresting said first portion (14) in a given position (X,Y) in relation to said table (2); at least a second portion (24) moving perpendicularly (Z) to said table (2) in relation to said first portion (14); and second means (65) for arresting said second portion (24) in relation to said first portion (14);
   means (13) for supporting and clamping said part (274) and securable to said second mobile portion (24) of said rearrangeable elements (10); and
   means (11) for moving said rearrangeable elements (10) in relation to said table (2), and said second portion (24) in relation to said first portion (14) of said rearrangeable elements (10).

2. A fixture as claimed in claim 1, characterised by the fact that said first portion of the said rearrangeable elements (10) is a tubular casing (14), and said second portion is an axially-sliding rod (24) angularly fixed inside an axial cavity (19) on said tubular casing (14).

3. A fixture as claimed in claim 2, characterised by the fact that said tubular casing (14) has an air-cushioned pad (88) designed to travel over said reference table (2).

4. A fixture as claimed in claim 3, characterised by the fact that said first arresting means comprise at least a magnet (91) housed in said air-cushioned pad (88) and facing said reference table (2).

5. A fixture as claimed in claim 2, characterised by the fact that said second arresting means comprise a hydraulically-activated flexible bush (65) housed inside said axial cavity (19) on said tubular casing (14).

6. A fixture as claimed in claim 5, characterised by the fact that said rearrangeable elements (10) comprise a pneumatic cylinder (49) having a piston (54) for maintaining under pressure the oil contained in a hydraulic circuit (84, 85) activating the said flexible bush (65).

7. A fixture as claimed in claim 4,
   characterised by the fact that said tubular casing (14) comprises means (106) for connecting first air supply means (158), and means (99, 100, 104) for supplying compressed air from said first connecting means (106) to said air-cushioned pad (88).

8. A fixture as claimed in claim 6, characterised by the fact that said rod (24) comprises means (37) for connecting second air supply means (198), and means (38, 44) for supplying compressed air from said second connecting means (37) to said pneumatic cylinder (49).

9. A fixture as claimed in claim 2,
   characterised by fact that the said rod (24) is supported radially in relation to said tubular casing (14) by a recirculating ball bush (64).

10. A fixture as claimed in claim 1, characterised by the fact that said moving means comprise a hand (11) which may be picked up by a mobile member (8) on said gauging machine (1); said hand (11) comprising an assembly (133) for connection to said mobile member (8), and at least and arm (151, 152) for picking up said rearrangeable elements (10).

11. A fixture as claimed in claim 10, characterised by the fact that said hand (11) comprises at least a pair of drive pins (157) designed to cooperate with respective seats (113) on said tubular casing (14).

12. A fixture as claimed in claim 11, characterised by the fact that said pins (157) are mounted by means of spherical joints (163) on to said pick-up arm (151, 152).

13. A fixture as claimed in claim 10, comprising first air supply means having at least a first injection device (158) mounted on said pick-up arm (151, 152); said connecting means on said tubular casing (14) comprising at least a bush (106) having an inner cavity (107) engaged by an outlet duct (159) on said first injection device (158).

14. A fixture as claimed in claim 10,
   characterised by the fact that it comprises a pair of said pick-up arms (151, 152); said arms (151, 152) being curved, diverging and symmetrical in relation to the vertical median plane of said hand (11).

15. A fixture as claimed in claim 14, comprising second air supply means having a second injection device (198) located between said pick-up arms (151, 152) and facing the opposite way to said connecting assembly (133); said rod connecting means comprising at least one hole (37) engaged by an outlet duct (159) on said second injection device (198).

16. A fixture as claimed in claim 15, characterised by the fact that said outlet ducts on said first and second injection devices (158, 198) comprise a pair of inner chambers (174, 175) communicating externally via radial holes (176) and not communicating directly with each other; said injection devices (158, 198) also comprising a bush (178) sliding against the action of a spring (179) and having an inner chamber (177) designed to connect said radial holes (176) of said chambers (174, 175) on said outlet duct (159).

17. A fixture as claimed in claim 15, characterised by the fact that said first and second injection devices (158, 198) are connected to said hand (11) via flexible retaining means (185).

18. A fixture as claimed in claim 10,
   characterised by fact that the said hand (11) comprises a forked element (24, 25) designed to cooperate with at least a pin (30) on said rod (24) for axially displacing said rod (24) in relation to said tubular casing (14).

19. A fixture as claimed in claim 2, characterised by the fact that said means for clamping said part (274) comprise a base (275) for assembly to said rod (24); a supporting element (276) securable to said rod (24) and designed to cooperate with a portion of said part (274); and a clamping element (314) integral with said assembly base (275) and designed to clamp said part (274) on to said supporting element (276).

20. A fixture as claimed in claim 19, characterised by the fact that said assembly base (275) comprises a seat (280) designed to cooperate with at least a portion of a side wall of said rod (24); and engaging means (284, 300) designed to retain said rod (24) inside said seat (280).

21. A fixture as claimed in claim 20, characterised by the fact that said engaging means comprise at least a pin (284, 300) designed to engage a respective seat (36) on said rod (24).

22. A fixture as claimed in claim 21, characterised by the fact that said engaging means comprise a pair of pins (284) designed to slide between an engaged position, wherein said pair of pins face inwards of said seat (280) on diametrically opposed sides, and a released position wherein said pair of pins are retracted into said assembly base (275); and manually contrastable elastic means (290) designed to maintain said pins (284) in said engaged position.

23. A fixture as claimed in claim 19,
characterised by the fact that said supporting elements (276) comprise a tubular portion (320) engaged by a top portion of said rod (24); and a flat top portion (321) designed to cooperate with said part (274).

24. A fixture as claimed in claim 23, characterised by the fact that said flat top portion (321) comprises at least a lateral appendix (328) having means (329) for pre-positioning said part (274).

25. A fixture as claimed in claim 24, characterised by the fact that said pre-positioning means comprise at least a cylinder (329) secured to said appendix (328) and designed to cooperate with a lateral contour of said part (274).

26. A fixture as claimed in claim 24, characterised by the fact that said tubular portion (320) of said supporting element (276) comprises at least a seat (323) for housing said pin (30) on said rod (24); and flexible means for retaining said pin (30).

27. A fixture as claimed in claim 19,
characterised by the fact that said clamping element (314) is a lever-operated, four-sided, articulated type.

28. A fixture as claimed in claim 1,
characterised by the fact that it comprises a rack (12) for storing said rearrangeable elements (10) to the side of the said reference table (2).

29. A fixture as claimed in claim 28, characterised by the fact that said rack comprises a number of assemblies (229) for clamping said elements (10); each of said assemblies (229) comprising means (245) and means (253) for respectively positioning and retaining said rearrangeable elements (10).

30. A fixture as claimed in claim 29, characterised by the fact that said positioning means comprise a pin (245) designed to cooperate with a respective seat (130) on said tubular casing (14) of said rearrangeable elements (10).

31. A fixture as claimed in claim 29, characterised by the fact that said retaining means comprise a pair of spring projections (253) cooperating with respective projections (128) on said tubular casing (14) of said rearrangeable elements (10).

32. A fixture as claimed in claim 28,
characterised by the fact that said rack (12) comprises a number of mobile plugging elements (266) designed to protect the inlet of said means (106) connecting said tubular casings (14) to said first air supply means (158).

* * * * *